Patented Aug. 23, 1927.

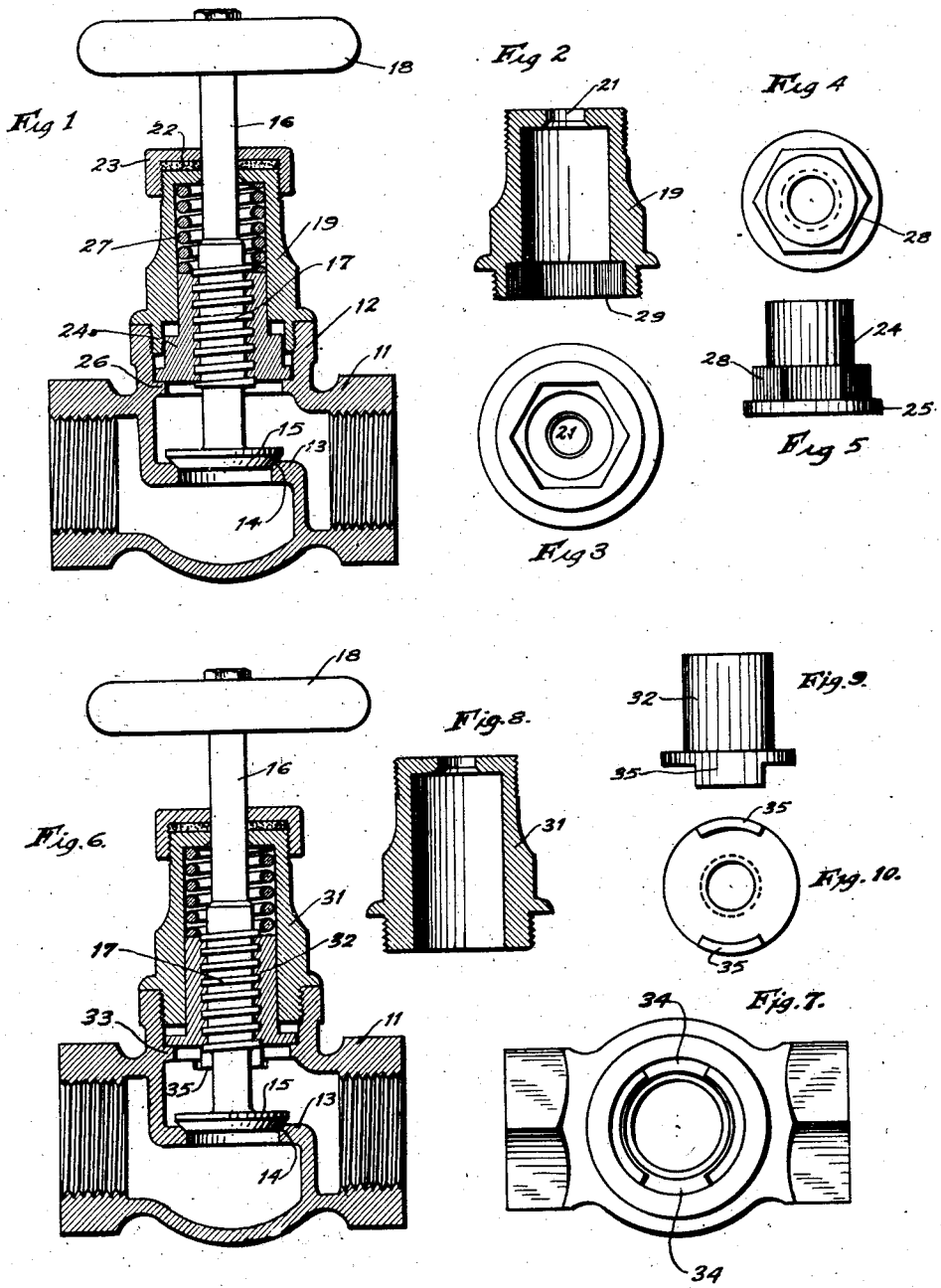

1,640,040

UNITED STATES PATENT OFFICE.

JOHN F. KELLY, OF CHICAGO, ILLINOIS, ASSIGNOR, BY MESNE ASSIGNMENTS, TO KELLY VALVE COMPANY, OF MUSKEGON, MICHIGAN, A CORPORATION OF MICHIGAN.

SELF-GRINDING VALVE.

Application filed February 13, 1922. Serial No. 536,040.

This invention relates in general to valves, and more particularly to what are commonly known as "globe valves", the purpose of the present invention being to provide a valve which will automatically, as it is opened and closed, grind the contact surfaces of the valve and seat so as to at all times insure a tight fit between the valve and seat, thereby prolonging the life and increasing the reliability and efficiency of the valve, and at the same time obviating the necessity of dismantling the valve for the purpose of regrinding the valve and seat.

In order to facilitate an understanding of my invention, I have illustrated on the accompanying drawings, preferred embodiments thereof, from an inspection of which when considered in connection with the following description, my invention and many of its inherent advantages should be understood and appreciated.

Referring to the drawings:

Fig. 1 is a vertical sectional view of a valve embodying my invention;

Fig. 2 is a detail sectional view of the valve bonnet;

Fig. 3 is a plan view of the bonnet shown in Fig. 2;

Fig. 4 is a plan view of the sleeve disposed within the bonnet;

Fig. 5 is a side elevation of the sleeve;

Fig. 6 is a view similar to Fig. 1, showing a modified form of the invention;

Fig. 7 is a plan view thereof with the bonnet removed;

Fig. 8 is a longitudinal sectional view of the bonnet;

Fig. 9 is a side elevation of the sleeve employed in this form of the invention; and Fig. 10 is a bottom view of the sleeve shown in Fig. 9.

In the form of the invention shown in Figs. 1 to 5 inclusive, the valve casing 11 is formed to provide the open topped internally threaded nipple 12 and is equipped with a diaphragm 13 having a tapered valve seat 14. A valve 15 adapted to snugly fit this seat is provided with a stem 16 threaded throughout a portion of its length, as indicated at 17 and equipped at its upper end with a hand wheel 18.

A bonnet 19 is threaded into the nipple 12 and provided at its upper end with an opening 21 through which the valve stem 16 projects, leakage around the stem being precluded by a gasket or packing 22 interposed between the top of the bonnet and a cap 23 threaded thereon.

A sleeve 24 threadedly engaged with the stem 16 is provided at its lower end with a circumferential flange 25 disposed between an internal flange 26 at the base of the nipple 12 and the lower edge of the bonnet 19 so that limited longitudinal movement of this sleeve between the flange 26 and the bottom of the bonnet 19 is permitted. A coiled expansion spring 27 is interposed between the upper end of the sleeve 24 and the upper end of the bonnet 19, this spring normally tending to urge the sleeve 24 downwardly into the position shown in Fig. 1.

For the purpose of preventing rotative movements of the sleeve, it is made just above the flange 25 polygonal in shape, as indicated at 28 and the lower portion of the bonnet 19 is correspondingly shaped on its interior, as indicated at 29, to receive this polygonal portion of the sleeve and permit longitudinal movement thereof, while holding the sleeve against rotative movement.

By manipulation of the hand wheel 18, the stem 16 is threaded downwardly or upwardly through the sleeve 24 to close or open the valve. During the closing movement when the valve is brought into engagement with its seat 14, further rotative movement of the stem will revolve the valve against the seat, thus grinding the opposed contacting surfaces, and during this grinding action, the sleeve 24 will travel upwardly in the bonnet against the force exerted by the spring 27. When the sleeve has reached the upward limit of its travel, the valve will be securely locked against its seat. Upon opening movement, the stem is turned in a reverse direction, and grinding action between the valve and the seat will take place until the sleeve 24 has been lowered into engagement with the supporting flange 26, whereupon the valve will be lifted from its seat.

In the form of the invention shown in Figs. 6 to 10 inclusive, the bonnet 31 has no provision for retaining the sleeve 32 against rotation but in this instance, the flange 33 is provided with one or more cut-away portions 34 into which lugs or projections 35 extend downwardly from the sleeve 32. These lugs lock the sleeve to the casing 11 against rotative movements, while permitting the requisite vertical or longitudinal movements to insure adequate grinding of the valve faces.

While preferred embodiments of the invention have been illustrated, it should be manifest that the details of construction are capable of wide variation and modification without departing from the spirit of the invention as defined in the following claim.

I claim:

In a self-grinding valve, a casing provided with a valve seat, an internally threaded nipple and an internal shoulder below the threads of the nipple, a valve bonnet adapted to be engaged with the threads in said nipple and arranged to provide with said shoulder an internal circumferential recess, a stem and valve extending into said casing through said bonnet, a sleeve in said bonnet in threaded engagement with said stem and having a portion guided in the lower portion of said bonnet and a radially directed circumferential shoulder extending into said circumferential recess and of less width than the width thereof, and a spring situated between the top of said bonnet and the top of said sleeve adapted to urge said sleeve and shoulder thereon toward the bottom of said recess.

JOHN F. KELLY.